No. 668,523. Patented Feb. 19, 1901.
T. H. KAVANAGH & G. E. ARTHUR.
HUB FASTENING.
(Application filed June 9, 1900.)
(No Model.)
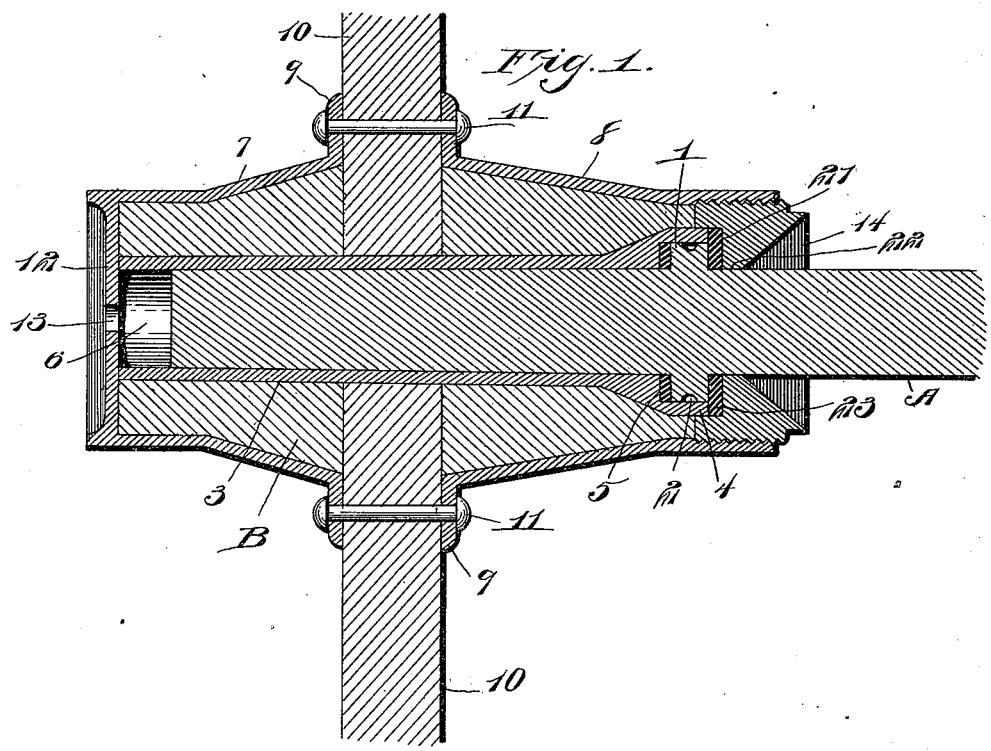
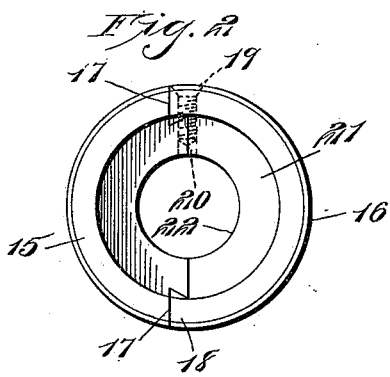
Witnesses
Louis D. Heinrichs
F. O. McCleary.
Inventors
T. Henry Kavanagh,
George E. Arthur,
By Victor J. Evans Attorney
THE NORRIS PETERS CO., PHOTO-LITHO., WASHINGTON, D. C.

UNITED STATES PATENT OFFICE.

THOMAS HENRY KAVANAGH AND GEORGE E. ARTHUR, OF HOLLAND, MINNESOTA.

HUB-FASTENING.

SPECIFICATION forming part of Letters Patent No. 668,523, dated February 19, 1901.

Application filed June 9, 1900. Serial No. 19,735. (No model.)

*To all whom it may concern:*

Be it known that we, THOMAS HENRY KAVANAGH and GEORGE E. ARTHUR, citizens of the United States, residing at Holland, in the county of Pipestone and State of Minnesota, have invented new and useful Improvements in Hub-Fastenings, of which the following is a specification.

Our invention relates to improvements in vehicle-hubs and means for securing the same upon an axle.

The object of the invention is to provide simple and effective means for securing the hub upon the axle and for retaining lubricating-oil within the hub. We attain this object by the construction and arrangement of parts described hereinafter, and the novelty of which will be particularly pointed out in the claims.

We have fully and clearly illustrated our invention in the accompanying drawings, wherein—

Figure 1 is a vertical longitudinal sectional view of our improved hub; and Fig. 2 is an elevation of the inner side of the retaining-nut, showing its adjusting or fastening screw in position.

Referring to the drawings, A designates the axle or journal for the hub, provided with an annular collar 1, which may be formed integral with the axle, as shown in the drawings, or secured thereon by screw-threads or other means. The periphery of this collar is provided with an annular groove 2, adapted to receive and retain lubricant. The hub of the wheel is provided with a sleeve 3, adapted to fit loosely upon the axle A and having its inner end cored out to form an annular flange 4, within which the collar on the axle fits. The sleeve is also provided with an annular shoulder 5, so that when the hub is adjusted upon the axle a space will be left between the end of the axle or journal and the end of the interior sleeve of the hub to contain lubricant. Within the annular flange 4 is placed a washer of leather or other suitable material, adapted to fit closely about the axle and fill the space between the shoulder 5 and the collar on the axle.

The hub B is provided with an exterior casing formed of two independent sections 7 and 8. These sections are formed at their inner ends with vertical annular flanges 9, adapted to be secured to the spokes 10 by bolts 11. The end of the section 7 is closed by one integral disk 12, formed with a perforation 13, through which lubricant may be injected into the hub. The outer end of the section 8 is internally screw-threaded to receive the threads of the hub-nut 14. The retaining-nut 14 consists of two semicircular sections 15 and 16, one of which has its ends recessed, as at 17, to receive the projections 18, formed on the ends of the other section, thus forming a scarf-joint when fastened together. The section 16 of the nut has one of its projecting ends provided with a screw-threaded opening adapted to receive a screw 19, which passes through the said screw-threaded opening and engages an interiorly-screw-threaded socket 20, formed partially in the section 15 and partially in the section 16, thus firmly uniting the two sections of the nut. The fastening-nut is cored out to form an annular recess 21 of sufficient depth to provide a space between the shoulder 22 of the nut and the collar on the axle for a washer 23, of leather or any other suitable material, which serves as packing to retain oil or such other lubricant as may be used upon the axle.

The parts constructed as thus described are readily assembled and afford an effective and durable hub-fastening.

We claim—

1. The combination with an axle provided with a collar; of a sleeve formed at its inner end with a shoulder; and an annular flange extending over said collar; a casing fitting on the hub and consisting of two sections, one of which is internally threaded at its inner end; and a retaining-nut consisting of two sections, one of which is recessed at its ends to receive projections on the other section; said nut having a threaded socket formed partly in each section; and a screw fitting said socket.

2. The combination with an axle having a collar projecting therefrom; of a sleeve fitting said axle and formed at its inner end with an annular flange fitting over said collar; a casing consisting of two flanged sections, the outer section being provided at its outer end with a perforated disk, and the inner end of the inner section being screw-threaded; a retaining-nut formed of two sections united by scarf-joints, and provided with a threaded socket formed partly in one section and partly in the other; and a screw fitting said socket.

In testimony whereof we affix our signatures in presence of two witnesses.

T. HENRY KAVANAGH.
  GEORGE E. ARTHUR.

Witnesses:
 O. P. NOSON,
 CARL S. WRIGHT.